J. J. CHESBRO.
LAWN MOWER SHARPENER.
APPLICATION FILED JULY 20, 1916.

1,247,505.

Patented Nov. 20, 1917.

Witness
Stuart Hilder.

Inventor
John J. Chesbro,
E. W. Anderson & Son
his Attorneys

UNITED STATES PATENT OFFICE.

JOHN J. CHESBRO, OF ONEONTA, NEW YORK.

LAWN-MOWER SHARPENER.

1,247,505.

Specification of Letters Patent.

Patented Nov. 20, 1917.

Application filed July 20, 1916. Serial No. 110,346.

*To all whom it may concern:*

Be it known that I, JOHN J. CHESBRO, a citizen of the United States, resident of Oneonta, in the county of Otsego and State of New York, have made a certain new and useful Invention in Lawn-Mower Sharpeners; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
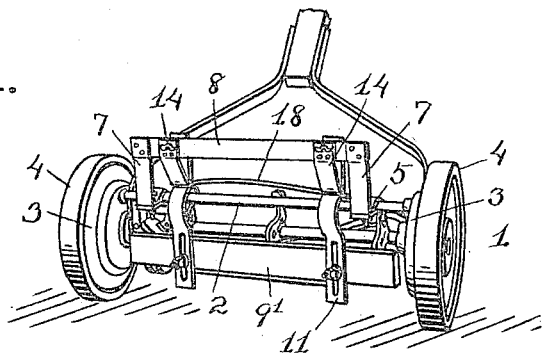
Figure 1 is a perspective view of the invention as applied.
Figure 2:
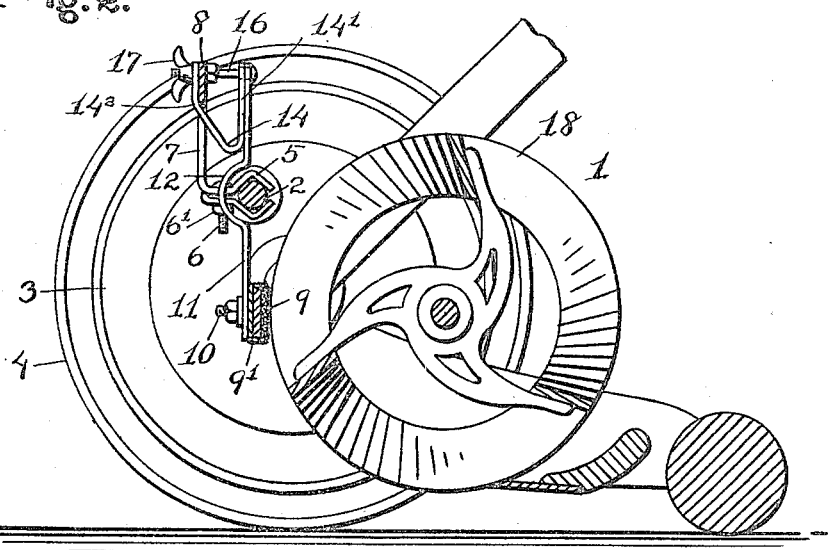
Fig. 2 is a central vertical transverse section of the invention, as applied.
Figure 3:
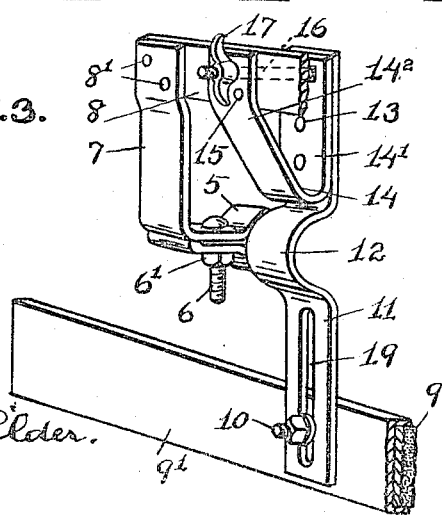
Fig. 3 is a detail fragmentary perspective view of the invention.

The invention has relation to lawn mower sharpeners, having for its object to provide certain improvements upon the device of the Patent No. 1,092,021, dated March 31, 1914.

The invention consists in the novel construction and combinations of parts, as hereinafter set forth.

In the accompanying drawings, illustrating the invention, the numeral 1 designates a lawn mower, having the transverse brace rod 2, connecting stationary plates 3 at the inner sides of the wheels 4.

The sharpener attachment is provided with a pair of clamping jaws 5 at each end thereof, designed for engagement with opposite end portions of said brace rod, bolts 6, connecting said jaws, bearing nuts 6′ for adjustment of the jaws. The upper jaw of each pair is bent at right-angles from the lower end of an upwardly extending strap 7, the two straps 7 at opposite ends of the attachment being at their upper ends connected by a longitudinal strap 8, bolted thereto at 8′.

The longitudinal sharpener stick or blade 9 is secured within a longitudinal boxing 9′, said boxing having bolt connection 10 with upwardly extending straps 11, located within the straps 7 and usually having bends 12 formed therein, intermediately of their length, to escape the brace rod.

The upper ends of the straps 11 have each bolted thereto at 13 one branch 14′ of a bow spring 14, said spring extending downwardly and back or upwardly to the longitudinal strap 8, to which the outer branches 14² of the bow springs are bolted at 15.

The branches of the bow springs are connected by bolts 16 bearing thumb nuts 17, adjustment of said nuts serving to bring the branches of the bow springs together or to allow said branches to spring apart, and thereby to vary the adjustment, outwardly and inwardly, of the straps 11 (acting as extension arms of said springs) and of the sharpener stick at the lower ends of said arms, to the revolving knives 18 of the mower.

The lower ends of the extension arms of the bow springs are longitudinally slotted at 19, the bolts 10 engaging and being adjustable in said slots to raise and lower the sharpener stick with relation to the mower knives.

It is found in practice that by the use of this invention the second pair of clamping jaws 8 and the squared bars 9 of the patent, with which said jaws engage, may be dispensed with to advantage, rendering the device capable of being more economically constructed, entirely of strap metal, with the exception of the sharpener stick.

I claim:

A sharpener attachment for lawn mowers, having at each end a two-part clamp for engagement with a transverse brace rod of the mower, an upwardly extending member integral and bent at right-angles to one of the members of said clamp, a horizontal member directly bolted at its ends and directly connecting to the upper ends of the upwardly extending members, bow springs carried by said horizontal member, extension arms bolted to the rear branches of said springs and projecting downwardly below said two-part clamp, a sharpener stick boxing having adjustable connection with the lower ends of said extension arms, and adjusting bolts connecting the branches of said springs, said bow springs being located at the upper end of the attachment, the sharpener stick at the lower end thereof, and the two-part clamps substantially midway of said springs and said stick.

In testimony whereof I affix my signature, in presence of two witnesses.

JOHN J. CHESBRO.

Witnesses:
CHAS E. CARRINGTON,
W. IRVING BOLTON.

Copies of this patent may be obtained for five cents each, by addressing the "Commissioner of Patents, Washington, D. C."